March 10, 1953 G. E. MORTON 2,631,178
INSTALLATION FOR RECLAIMING FLUE DUST
Filed Dec. 23, 1949

George E. Morton
INVENTOR.

BY Clarence A. O'Brien
and Harvey B. Jacobson
Attorneys

Patented Mar. 10, 1953

2,631,178

UNITED STATES PATENT OFFICE 2,631,178

INSTALLATION FOR RECLAIMING
FLUE DUST

George E. Morton, Wilkinsburg, Pa.

Application December 23, 1949, Serial No. 134,637

2 Claims. (Cl. 13—10)

This is a continuation-in-part of my co-pending application, Serial No. 647,963, filed February 15, 1946, now abandoned.

This invention relates to the reclaiming or recuperation of the flue dust carried off by the gases escaping from a blast furnace and it has for its principal object to provide a method and an installation for the treatment of the flue dust after separation from the gases carrying it, which brings a high percentage of valuable material into condition for recharging it into the blast furnace. The method and installation according to the invention also simplify the treatment which therefore can be carried out at lower maintenance and operational costs than the processes which have been hitherto used.

The flue dust carried off by the gases of a blast furnace produces a material loss of iron production due to the relatively large proportion of iron oxide which is carried off by the blast furnace gases. If relatively fine ores such as, for instance, the ores from the Massaba range are used, the loss is particularly large. Average values of flue dust in the outlet gases leaving at the top of the blast furnace are from 10 to 45 grains per cubic foot of the gases but much higher values have been registered in some plants.

Flue dust contains iron oxide, carbon and lime which are all derived from the original charging material. The flue dust consists of small particles of coke and of undecomposed ore and limestone thus representing clearly a loss of these materials for the production process.

Attempts have therefore been made to recharge the flue dust into the blast furnace. The flue dust is always separated from the gases which carry it because the gases are utilized for combustion processes carried on in conjunction with the main process or in a collateral process. Therefore, the flue dust is invariably separated out or extracted and has to be disposed of.

Experience has shown that the reintroduction of the flue dust into the blast furnace as such, after separation from the gases, does not produce any material advantage and does not solve the problem of disposing of the flue dust or of overcoming the loss. The flue dust is a product of abrasion and of the chemical reduction and smelting processes and its particles are, therefore, of such fineness that when introduced into the blast furnace they are carried along by the air and gas stream within the said blast furnace and reappear as flue dust. Only an insignificant percentage of the reintroduced flue dust enters into and is absorbed by the production process, but, as this reintroduction is accompanied by a material lowering of the output, the small gain which may be obtained in this way is more than counterbalanced by production losses.

The attempts to reduce the above mentioned losses frequently included steps intended to bring the flue dust into some aggregate form in which recharging can take place without the disadvantages due to the fineness of the particles and these steps therefore involved a sintering, nodulizing or briquetting process. Such a process, however, can only be carried out with the addition of relatively large quantities of additional fuel or by using large quantities of gas as such and expensive and bulky equipment is usually necessary. Moreover ore fines, combustible adhesives and other substances have to be added to the flue dust either in order to produce the required aggregation or conglomeration or to prevent a packing of the blast furnace which is frequently the consequence of the recharging.

The invention comprises a simplified process for bringing the flue dust into the required or appropriate condition for recharging, which process can be carried out with a simple and inexpensive equipment. Briefly stated, the invention consists in treating the flue dust, after it has been completely separated from the gases, in an electric arc, by passing the flue dust after separation in a continuous stream between the electrodes of the electric arc as fast as it is produced and is separated from the gas stream. The electric arc produces a temperature which is high enough to fuse the flue dust particles in quantities so that the entire stream, during its passage between the electrodes, is converted into pellets and clinkers which may then immediately be recharged into the blast furnace.

The process may be carried out by means of a rotating table on which the flue dust is piled up continuously in a heap of a certain elevation and of limited width, the said width being such that the piled up material may pass the space between the common electrodes between which the electric arc has been struck, the rotating table forming the transportation means for the material from the point at which the flue dust is delivered to the point at which it is discharged.

The advance of the flue dust material may also be obtained within an inclined rotating drum along the bottom of which the material advances in a stream of limited width and along which it is carried through the space between and around the electrodes projecting into the drum from the outside with their ends positioned near the bottom portion of the said drum.

The process according to the invention is thus a simple and continuous process using a minimum of moving machinery and converting the flue dust into a material of such aggregate form that, when recharged, it can be absorbed by and can participate in the usual blast furnace process without affecting the same. A high percentage of the flue dust is thus reclaimed without accompanying losses due to the reintroduction. The electric arc used for the conversion process, on the other hand, does not need any additional source of power other than the power mains and its energy consumption is relatively small.

The invention is illustrated in the accompanying drawing showing two modifications of the equipment with which the process may be carried out. It is however to be understood that the diagrammatic showing of the drawing is merely intended to furnish a basis for the explanation of the principle of the invention and for several modes of carrying the principle into effect. The diagrams illustrating the invention do not attempt to give an exhaustive survey of those constructions which embody the invention and a modification of the examples which have been illustrated is therefore not necessarily a departure from the essence of the invention.

Figure 3:
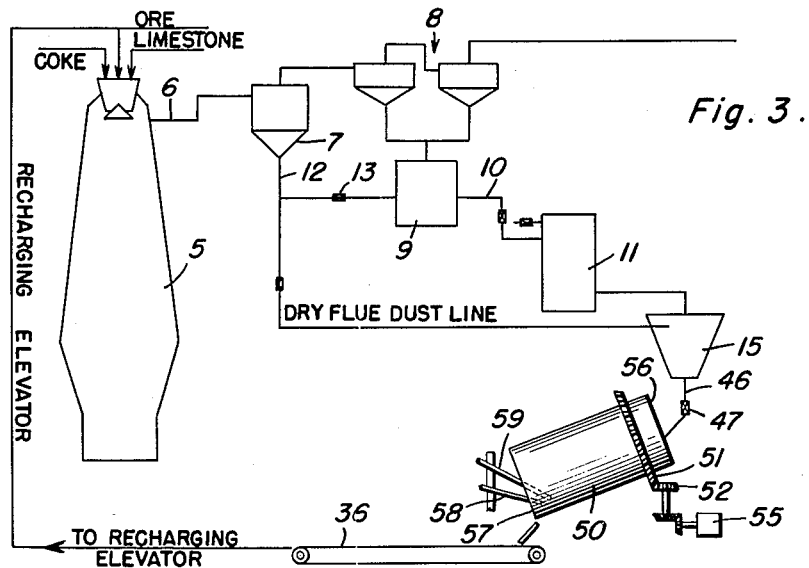
Figure 3 is a diagram of an installation forming a modification of the installation illustrated in Figure 1.

In the installation shown in the diagrams, the gas from the blast furnace passes through a gas pipe diagrammatically indicated at 6 onto a coarse dust catcher 7 and is then conveyed to the gas washer or gas cleaner 8 for the purpose of segregating the fine dust particles. Usually the separation is obtained by means of water. The gas washer, as a rule, operates in two stages and discharges the collected dust into a mixer 9 where a sludge is formed which is ultimately discharged through a duct or channel 10 into a sludge pit 11 where it is left to settle. In many cases a pipe line 12 preferably provided with a shut-off valve 13 leads from the lower part of the coarse dust catcher 7 to the mixer 9.

The gas cleaning and flue dust separating and collecting method which has been above described is one of the well known and frequently practiced methods. The steps used to obtain the above named result of separating the flue dust from the gases may, however, vary and different methods may be used. This change will not affect the process according to the present invention, as it is immaterial in which way the separation, collection and treating of the flue dust is effected.

The flue dust which has settled in the pit 11 is now delivered into a receiving hopper 15, a process which may be continuous and automatic. When the flue dust which has been separated in the coarse dust catcher 7 is sufficiently dry it may be conveyed and delivered directly to the hopper 15 by means of a special pipe (not shown) instead of being delivered to the mixer.

The hopper 15 is provided with a vertical or inclined feed chute or delivery pipe 16 which may or may not be provided with a regulating or shut-off valve 17. Below the feed chute or delivery pipe a rotating substantially horizontal table 18 is arranged. The table has the shape of a circular disk and is mounted for rotation on a shaft 20 driven by means of gear wheels 21, 22 by electric motor 23 which is of the variable speed type so that the rotational speed may be finely regulated.

At a suitable arcuate distance from the delivery end of the feed chute 16 of the hopper 15 two or more electrodes 25, 26 are arranged and held in such a manner that their ends project into the space above said table at a suitable distance therefrom and also at a suitable distance from each other which is preferably adjustable. The electrodes are provided with current in the usual manner (not shown) the power applied being preferably adjustable.

Between the electrodes 25, 26 and the feed chute 16 of the hopper, a guide plate 28 is arranged which projects into the path along which the particles delivered by the feed chute are carried by the rotating table 18. The guide plate 28 therefore deflects a pile of particles towards the electrodes and is so arranged that the piled up material will pass between them. The guide plate may be pivotally mounted on a post in order to make its position adjustable but in this case it is also provided with means for holding it in the position into which it has been brought.

On the other side of the electrodes a scraper or screed plate 30 is arranged which preferably occupies a radial position and projects outwardly from the center of the rotating table.

The scraper or screed plate 30 may be swingable around the shaft 20 and for this purpose it is provided with a sleeve 31 encircling the shaft 20. A second or auxiliary guide plate 32 may be connected with the scraper plate 30. This auxiliary guide plate preferably projects towards the guide plate 28 and deflects the material conveyed from the feed chute to the electrodes and prevents it from being pushed towards the center. It also limits the width of the pile which is formed on the table and which is conveyed towards the electrodes.

The scraper or screed plate 30 and the auxiliary guide plate 32 are adjustable around the shaft 20. They may form one piece and a segment 33 may be provided near the table which has a number of stops 34, as shown, in order to indicate that the scraper plate 30 can be swung around and fixed in the position which is considered as the most favorable one.

Below the scraper plate 30 and closely adjacent to the same and to the table an unloading or delivery chute 35 is provided into which the pellets or lumps of fused material are dumped. These lumps or pellets slide down the chute onto a conveyor 36 which carries them to one of the elevators charging the blast furnace or to a separate elevator leading to the top of the blast furnace. These pellets or lumps of fused material are then dropped in the usual manner onto the bell on top of the stack of the blast furnace.

Figure 1:
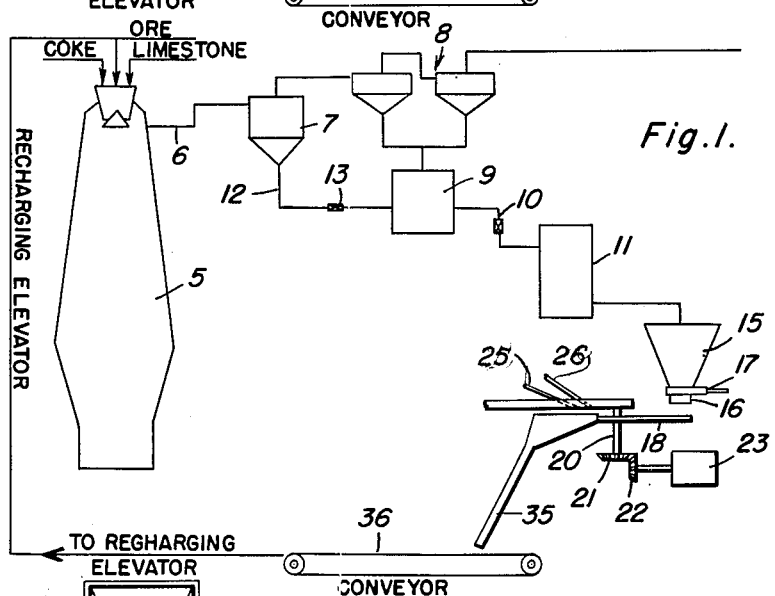
Figure 1 is a diagram illustrating one modification of the invention.
Figure 2:
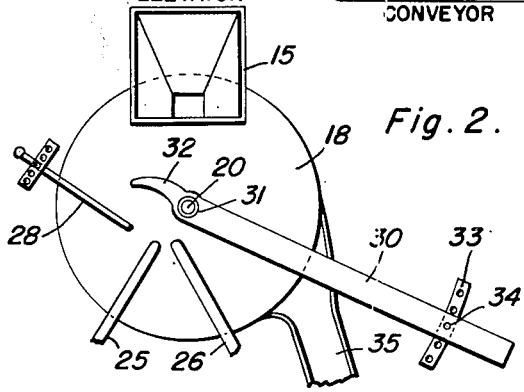
Figure 2 is a diagrammatic plan view of the rotating table and the adjacent members.

In the modification shown in Figure 3 the process is very similar. The process for the separation of the flue dust from the gases is the same as that described in connection with the diagram shown in Figure 1 and therefore need not be described. The flue dust which has settled, whether wet or dry, is delivered into the receiving hopper 15 and from the hopper is delivered by a vertical or inclined pipe 46 which may be provided with a regulating valve 47 to a rotating drum 50 which is provided with a closed and with an open end which is rotating around an axis inclined to the horizontal. The drum 50 may be lined with brick or with another refractory material. The drum is rotated by means of gear wheels 51, 52 one of which may be fixed on the exterior of the drum 50. The gear wheels are driven by a variable speed motor 55.

It will be clear that the material introduced through the pipe at the closed end 56 will slowly advance through the rotating drum, mostly near the bottom of the drum and will reach the open end 57.

Through the open end of the drum two or more carbon electrodes 58, 59 project into the rotary drum between which an arc is formed near the said end and also near the bottom along which the stream of material advances. The electrodes are preferably adjustable and arranged at an angle with respect to each other and also with respect to the axis of the drum. The material moves toward the arc and through the space between the electrodes by virtue of gravity. The advance of the material through the rotary drum may be regulated by regulating the speed of the driving motor 55.

In both modifications a stream of flue dust of limited width is formed on the table or within the rotating drum which passes substantially between the electrodes and therefore through the electric arc formed by the electrodes or in the immediate vicinity of the arc. The material passing through the arc is fused by the heat generated therein, a temperature of around 1800° to 2200° F. being required for such fusing process.

Clinkers, pellets or simply lumps of molten mass are formed which are in an aggregate state and of a composition which permits recharging into the blast furnace. The lumps contain iron ore in high concentration and they may therefore be charged either separately or together with the other materials of the blast furnace charge in the usual manner.

The process of flue dust reclaiming or recuperating as above described is a process based on a continuous uninterrupted circulation of the flue dust from the top of the blast furnace back to the top of the blast furnace which process may be so regulated that it is never interrupted, while the flue dust in one or other aggregate state always moves along at more or less uniform speed. The process therefore needs little supervision once the proper adjustment has been made. Moreover the product contains a higher percentage of metal bearing substances than the products which are obtained by the usual gas operated sintering processes.

In addition to the main advantages which have been described above, other advantages are gained which permit to obtain beneficial results. One of the advantages consists in the compactness and simplicity of the installation by means of which the process is carried into effect and which results in a great saving as regards installation and maintenance costs. Another advantage consists in the fact that the reclaiming furnace may be operated during any length of time and that the operation may be interrupted or stopped for long periods without great disadvantage. During the stoppage period one of the usual processes may be carried out or the flue dust may simply be stored in the pits until the process may be taken up again. The electric arc sintering process may therefore be used mainly during those periods during which other power consuming electric equipment is not operated or is not operated to full capacity so that the operation of the arc helps in maintaining an even electric power consumption level.

The process has marked advantages over those processes in which blast furnace gas is used as a fuel to carry out the sintering, nodulizing or other process required to change the aggregate form of the flue dust. The process according to the present invention has a greater safety factor and eliminates the gas hazard. Moreover, the maintenance and operating costs are lower and the control of the temperature for carrying out the conversion process is improved. The process according to the present invention therefore has a greater adaptability for the requirements of the blast furnace process so that the electric units of the blast furnace may be used either as a central unit cooperating with all the blast furnaces of an installation or as an auxiliary blast furnace equipment.

The process according to the present invention also has the additional advantage of a better separation of the impurities and of a higher percentage of metallic substances in the ultimate product which is fed back into the blast furnace. Flue dust itself contains iron ore in high concentration. It is therefore desirable that this concentration be maintained or improved during the separation and preparation process to which the flue dust is subjected.

However, in most preparation processes additional materials have to be added for various purposes, as above mentioned, which addition causes a marked reduction in the ore concentration. The electric arc process however can be carried out without any addition and moreover there is a marked tendency to remove and volatilize impurities. The electric arc process therefore presents marked advantages also as regards the concentration of the reclaimed material.

The foregoing specification has described the process according to the invention partly in specific terms. But it is to be understood that changes of an unessential nature will not in any way affect the essence of the invention.

Having described the invention, what is claimed as new is:

1. A flue dust reclamation installation associated with blast furnaces, including means for separating the flue dust from the blast furnace gases and comprising a closed continuous circulation path leading from the gas discharge end of the blast furnace to the charging end thereof, said path including gas pipes provided with flue dust separators, a feeding chute, supplying a continuous stream of flue dust, means for conveying the flue dust from the said separators of the gas pipe to the said feeding chute, a horizontally disposed rotating table in operative relation to said feeding chute, acting as a conveyor for the flue dust material delivered by said chute and piled up on said rotating table, electrodes located above the said table in the path of the pile of flue dust conveyed by the table, said electrodes being adapted to produce an electric arc through and around which the piled flue dust material passes, means for supplying the said electrodes with current, the electric arc thus producing lumps of flue dust material, and means for continuously conveying the fused lumps of flue dust material from the electric arc back to the top of the blast furnace.

2. A flue dust reclamation installation associated with blast furnaces, including means for separating the flue dust from the blast furnace gases and comprising a closed continuous circulation path leading from the gas discharge end of the blast furnace to the charging end thereof, said path including gas pipes provided with flue dust separators, a feeding chute, supplying a continuous stream of flue dust, means for conveying the flue dust from the said separators of the gas pipe to the said feeding chute, a horizontally disposed rotating table in operative relation to said feeding chute, acting as a conveyor for the flue dust material delivered by said chute, electrodes located above the said table in the path of the flue dust conveyed by the table, said electrodes being adapted to produce an electric arc, means for supplying the said electrodes with current, a fixed guide plate above the rotating horizontal table between the point of delivery of the flue dust material from the feeding chute and the electrodes directing the stream of material conveyed by the rotating table substantially in a direction inclined to the direction of advance of the flue dust stream to increase the depth and to limit the width of the advancing flue dust material, thus passing the flue dust material through and around the electric arc struck between the electrodes, the said arc producing continuously lumps of fused flue dust material, a scraper plate arranged above the horizontal table near the electrodes for removing the fused material from the table and means for conveying the fused material back to the top of the blast furnace in a continuous stream.

GEORGE E. MORTON.

REFERENCES CITED

The following references are of record in the file of this patent:

UNITED STATES PATENTS

| Number | Name | Date |
|---|---|---|
| 780,716 | Gates | Jan. 24, 1905 |
| 875,332 | Dull et al. | Dec. 31, 1907 |
| 995,542 | King | June 20, 1911 |
| 1,041,363 | Souther | Oct. 15, 1912 |
| 1,800,721 | Dyer et al. | Apr. 14, 1931 |
| 2,074,819 | Weitzenkorn | Mar. 23, 1937 |
| 2,085,625 | Anderson | June 29, 1937 |
| 2,139,065 | Betterton et al. | Dec. 6, 1938 |
| 2,351,677 | Gygi | Jan. 20, 1944 |
| 2,402,190 | Van Der Pyl | June 18, 1946 |
| 2,426,643 | Ridgway | Sept. 2, 1947 |